United States Patent [19]
Nanami et al.

[11] Patent Number: 6,089,932
[45] Date of Patent: *Jul. 18, 2000

[54] SMALL WATERCRAFT

[75] Inventors: Masayoshi Nanami; Toshiyuki Hattori, both of Shizuoka, Japan

[73] Assignee: Yamaha Hatsudoki Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,801

[22] Filed: Mar. 19, 1997

[30]      Foreign Application Priority Data

Mar. 19, 1996  [JP]  Japan ................................. 8-063200

[51] Int. Cl.[7] .................................................. B63H 21/38
[52] U.S. Cl. ...................... 440/88; 114/55.51; 123/90.31; 440/111
[58] Field of Search ................................ 114/211, 270, 114/55.5, 55.51; 440/111, 88, 38, 112; 123/90.31

[56]              References Cited

U.S. PATENT DOCUMENTS

| | | | |
|---|---|---|---|
| 3,006,311 | 10/1961 | Hansson et al. | 440/75 |
| 3,982,497 | 9/1976 | Caron | 114/270 |
| 4,568,293 | 2/1986 | Yazaki | 114/211 |
| 4,753,199 | 6/1988 | Melde-tuczai et al. | 123/90.31 |
| 4,982,682 | 1/1991 | Hattori | 114/211 |
| 4,984,528 | 1/1991 | Kobayashi . | |
| 5,049,100 | 9/1991 | Yamamoto et al. | 440/88 |
| 5,237,950 | 8/1993 | Abe et al. | 114/270 |
| 5,323,739 | 6/1994 | Mollers | 123/90.31 |
| 5,340,344 | 8/1994 | Mineo et al. | 440/88 |
| 5,390,621 | 2/1995 | Hattori et al. . | |
| 5,490,474 | 2/1996 | Ikeda . | |
| 5,511,505 | 4/1996 | Kobayashi et al. . | |
| 5,558,549 | 9/1996 | Nakase et al. . | |
| 5,634,832 | 6/1997 | Nakase et al. | 440/88 |
| 5,647,315 | 7/1997 | Saito . | |
| 5,664,515 | 9/1997 | Hattori et al. . | |
| 5,839,930 | 11/1998 | Nanami et al. . | |

*Primary Examiner*—Sherman Basinger
*Attorney, Agent, or Firm*—Knobbe, Martens, Olson & Bear, LLP

[57]                ABSTRACT

A small watercraft includes a four-cycle engine which is arranged within a hull of the watercraft to enhance ventilation of and air induction into the engine. The hull includes at least one air duct which opens into an engine compartment within the hull at a level below an upper rim of the flywheel. A case cover of the flywheel assembly acts as a guide to direct at least a portion of the air flow, which enters the engine compartment at this location, upward over the engine and toward the engine's air intake. The engine also can be oriented to angle its output shaft relative to a keel line of the hull in order to provide ample space for a sufficiently sized flywheel assembly, as well as to decrease the distance between the bottom of the watercraft and the axis of the impeller shaft. As a result, the length from the gullet inlet and to the impeller is shortened to improve pumping efficiency and thus enhance thrust performance.

41 Claims, 7 Drawing Sheets

Figure 7

SMALL WATERCRAFT

BACKGROUND OF THE INVENTION

1. Field of the Invention

The present invention relates in general to a small watercraft, and more particular to the mounting arrangement of a four-cycle engine within a hull of a small watercraft.

2. Description of Related Art

Personal watercraft have become popular in recent years. This type of watercraft is sporting in nature: it turns swiftly, is easily maneuverable, and accelerates quickly. For this purpose, these crafts commonly include a small hull in which an engine is housed. The engine powers a jet pump unit of the watercraft.

Some personal watercraft recently have become equipped with four-cycle engine in response to increased concerns regarding hydrocarbon emissions. These valved engine generally reduces hydrocarbon emissions in comparison to two-cycle, crankcase compression engine, which are widely used with personal watercraft.

SUMMARY OF THE INVENTION

An aspect of the present invention involves the adaptation of a mass-produced, four-cycle engine, such as an automobile engine, to a confined space within the hull of a small watercraft in order to reduce the cost of the watercraft. The use of a mass produced engine, however, raises some formidable challenges in regard to engine layout and arrangement within the hull. For instance, the large diameter flywheel on the four-cycle engine tends to interfere with the air flow through the compact engine compartment for cooling purposes, as well as interferes with the air flow into the engine's induction system. The present engine mounting arrangement thus is designed to provide adequate cooling of the engine compartment and sufficient air supply to the engine's induction system.

One aspect of this invention thus is adapted to be embodied in a small watercraft that includes a hull defining an engine compartment at a location between a bow and a stern of the watercraft. The hull has at least one air duct which places the engine compartment in communication with atmospheric air outside the hull. An engine is positioned within the engine compartment and powers a propulsion device. The engine includes a flywheel assembly that is located on a stern side of the engine and has a periphery. The air duct is arranged to open into the engine compartment at a location below an upper portion of the flywheel periphery. The air flow entering the engine chamber through the air duct opening is guided upwardly over the and toward the engine's air intake by the flywheel assembly in order to enhance ventilation of and air intake into the engine.

Another aspect of the invention involves a small watercraft comprising a hull that defines an engine compartment which is located between a bow and a stern of the watercraft. The engine compartment has at least one air duct that places the engine compartment in communication with atmospheric air outside the hull. An engine is positioned within the engine compartment and powers a propulsion device. The engine includes a flywheel assembly and a camshaft drive. The camshaft drive and the flywheel assembly are located on a bow side of the engine, and an opening of the air duct is located on the bow side of and near the camshaft drive. Air entering the engine compartment through the air duct flows both upward and downward over camshaft drive to provide continual air cooling of the drive.

In accordance with an additional aspect of the invention, a small watercraft includes a hull having a keel line with a generally straight aft segment. The keel line extends in a fore-aft direction. The hull also defines an engine compartment. An engine is positioned within the engine compartment and powers a propulsion device. The engine includes a crankshaft arranged within hull to extend in the fore-aft direction and in an orientation that is skewed relative to the aft segment of the keel line. The skewed orientation of the crankshaft provides ample space at the front of the engine between engine components and the bottom of the hull, while locating the aft end of the crankshaft near the hull's lower surface. As a result, the distance from an inlet to an impeller of the propulsion device can be shortened to improve pumping efficiency and thus to enhance thrust performance.

Another aspect of the present invention involves a small watercraft comprising a hull that defines an engine compartment at a location between a bow and a stern of the watercraft. The hull includes at least one air duct which places the engine compartment in communication with atmospheric air outside the hull. An engine is positioned within the engine compartment and powers a propulsion device. The engine includes a crankshaft and a flywheel assembly attached to an end of the crankshaft on a stern side of the engine. An output shaft is connected to the flywheel assembly and a coupling connects the output shaft to a drive shaft of the propulsion device. The coupling is located on the stern side of the flywheel assembly. The air duct includes an opening that opens into the engine compartment on the stern side of the flywheel assembly. A portion of the air flow into the engine compartment at this location cools the coupling.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF PREFERRED EMBODIMENTS

FIGS. 1–4 illustrate a personal watercraft 10 which includes an arrangement of an engine 12 and a ventilation system 14 within a hull 16 of the watercraft 10 in accordance with a preferred embodiment of the present invention. The engine 12 and ventilation system 14 are arranged within an engine compartment 18 of the hull 16 in a manner which enhances air flow through the engine compartment 18. As a result, air cooling of the engine and associated components increases and air induction into the engine eases.

Although the present invention is illustrated in connection with a personal watercraft, it is understood that the engine and ventilation system arrangement can be used with other types of watercraft as well. For example, but without limitation, the present engine and ventilation arrangement can be used with small jet boats and the like.

Figure 1:
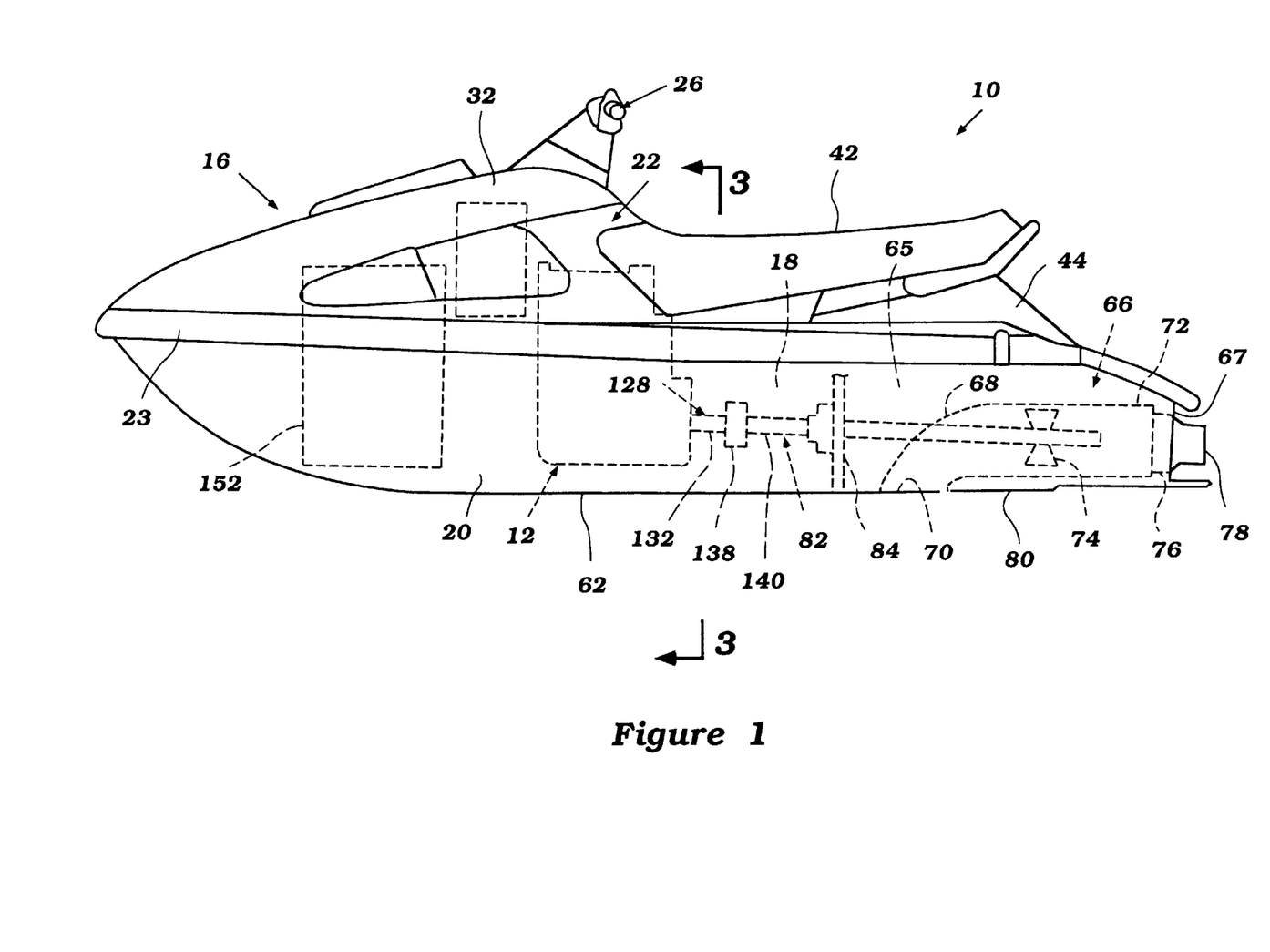
FIG. 1 is a side elevational view of a personal watercraft configured in accordance with a preferred embodiment of the present invention, and illustrates several internal components the watercraft in phantom.

Before describing the engine 12 and its arrangement within the engine compartment 18 relative to the ventilation system 14, an exemplary personal watercraft 10 will first be described in general detail to assist the reader's understanding of the environment of use. The hull 16 of the watercraft 10 is formed by a lower hull section 20 and an upper deck section 22. The hull sections 20, 22 are formed from a suitable material such as, for example, a molded fiberglass reinforced resin. The lower hull section 20 and the upper deck section 22 are fixed to each other around the gunnel 23 in any suitable manner.

As viewed in the direction from the bow to the stern of the watercraft, the upper deck section 22 includes a bow portion 24, a control mast 26 and a rider's area 28. The bow portion 24 slopes upwardly toward the control mast 26 and includes at least one air duct 30 through which air can enter the hull 16. A cover 32 extends above an upper end 34 of the air duct 30 to inhibit an influx of water into the hull 16.

The air duct 30 extends from above the deck 22 into the engine compartment 18. A lower end 36 of the air duct lies near a lower end of the engine 12, as described in more detail below.

The control mast 26 extends upward from the bow portion 24 and supports a handlebar assembly 38. The handlebar 38 controls the steering of the watercraft 10 in a conventional manner. The handlebar assembly 38 also carries a variety of controls of the watercraft 10, such as, for example, a throttle control, a start switch and a lanyard switch.

The rider's area 28 lies behind the control mast 26 and includes a seat assembly 40. In the illustrated embodiment, the seat assembly 40 has a longitudinally extending straddle-type shape which may be straddled by an operator and by at least one or two passengers. The seat assembly 40, at least in principal part, is formed by a seat cushion 42 supported by a raised pedestal 44. The raised pedestal 44 forms a portion of the upper deck 22, and has an elongated shape that extends longitudinally along the center of the watercraft 10. The seat cushion 42 desirably is removably attached to a top surface of the pedestal 44 by one or more latching mechanisms 46 (FIG. 3) and covers the entire upper end of the pedestal 44 for rider and passenger comfort.

An access opening 48 is located on an upper surface of the pedestal 44. The access opening 48 opens into an engine compartment 18 formed within the hull 16. The seat cushion 42 normally covers and seals closed the access opening 48. When the seat cushion 42 is removed, the engine compartment 18 is accessible through the access opening 48.

The pedestal 44 also includes at least one rear air duct 50. In the illustrated embodiment, the rear air duct 50 is located in front of the access opening 48. An upper end 52 of the air duct 50 communicates with the atmosphere through a space between the pedestal 44 and the cushion 42 which is formed forward of the access opening 48. A lower end 54 of the air duct 50 is located near a lower wall 56 of the hull 16.

Figure 3:
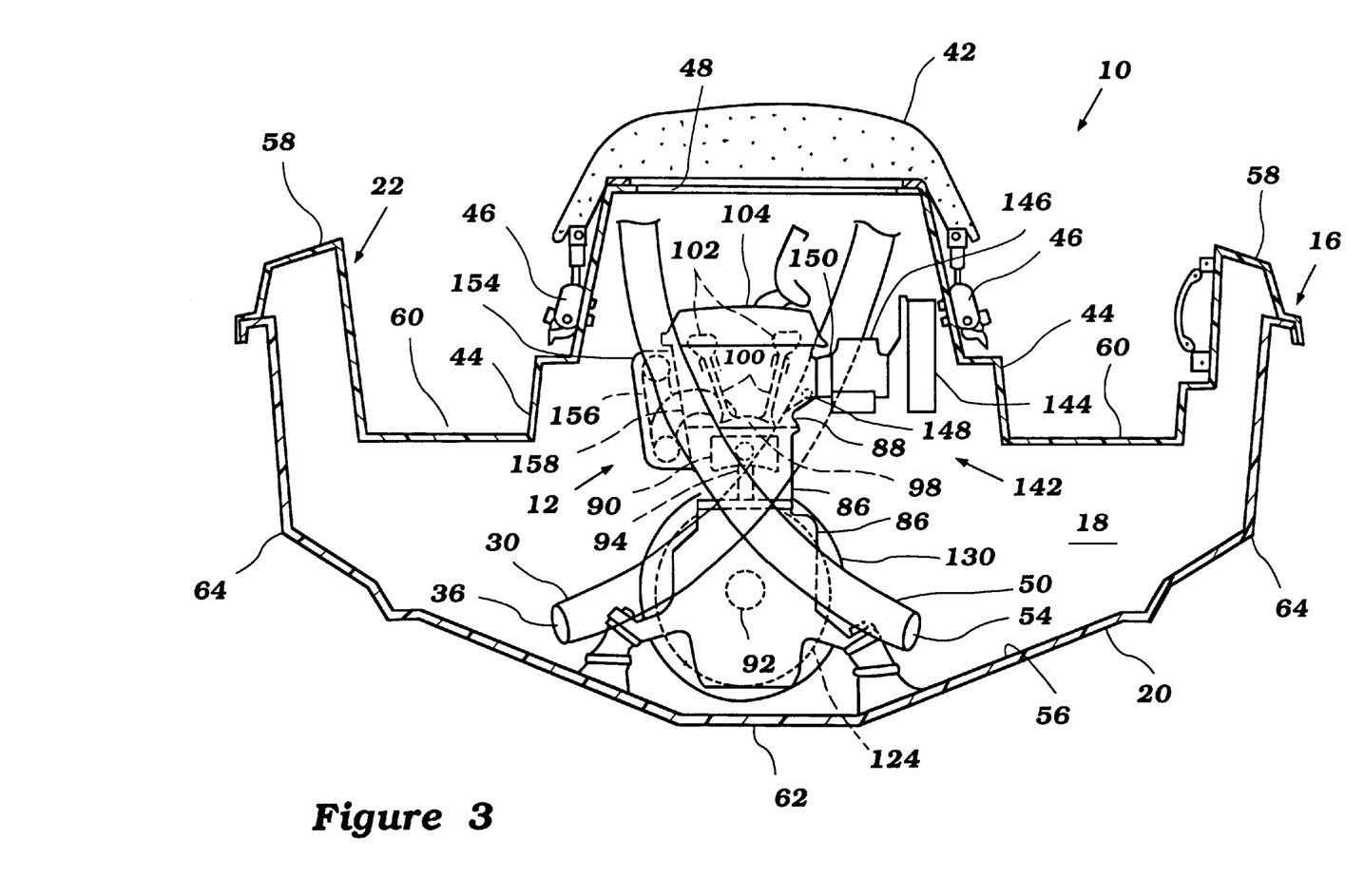
FIG. 3 is a cross-sectional view of the watercraft taken along line 3—3 of FIG. 1.

As best seen in FIG. 3, the upper ends 34, 52 of the front and rear air ducts 34, 50 are located on opposite sides of the upper deck 22. In the illustrated embodiment, the upper end 34 of the front air duct 30 is located on the starboard side of the watercraft 10, and the upper end 52 of the rear duct 50 is located on the port side of the watercraft 10. Each air duct 30,50 crosses over the center of the water craft such that their respective outlet ends 36, 54 also lie on opposite sides of the watercraft 10 from each other. In the illustrated embodiment, the lower end 36 of the front air duct 30 lies on the port side of the engine 12 within the engine compartment, and the lower end of the rear air duct 50 lies on the starboard side of the engine 12.

The upper deck section 22 of the hull 12 advantageously includes a pair of raised bulwarks 58 positioned on opposite sides of the aft end of the upper deck assembly 22. The raised bulwarks 58 define a pair of foot areas 60 that extend generally longitudinally and parallel to the sides of the pedestal 44. In this position, the operator and any passengers sitting on the seat assembly 40 can place their feet in the foot areas with the raised bulwarks 58 shielding the feet and lower legs of the riders. A non-slip (e.g., rubber) mat desirably covers the foot areas 60 to provide increased grip and traction for the operator and the passengers.

The lower hull portion 20 principally defines the engine compartment 18. Except for the air ducts 30, 50, the engine compartment is normally substantially sealed so as to enclose an engine 18 of the watercraft 10 from the body of water in which the watercraft is operated.

The lower hull 20 is designed such that the watercraft 10 planes or rides on a minimum surface area of the aft end of the lower hull 20 in order to optimize the speed and handling of the watercraft 10 when up on plane. For this purpose, as seen in FIG. 3, the lower hull section generally has a V-shaped configuration formed by a pair of inclined section that extend outwardly from the keel line 62 to outer chines 64 at a dead rise angle. The inclined sections extend longitudinally from the bow toward the transom of the lower hull 20 and is seen in FIG. 3, extend outwardly to side walls of the lower hull. The side walls are generally flat and straight near the stern of the lower hull and smoothly blend towards the longitudinal center of the watercraft at the bow. The lines of intersection between the inclined section and the corresponding side wall form the outer chines 64 of the lower hull section 20. The lower hull 20 can also include additional chines between the keel line 62 and the outer chines 64 for improved handling, as known in the art.

Toward the transom of the watercraft, the incline sections of the lower hull extend outwardly from a recessed channel or tunnel 65 that extends upward toward the upper deck portion 22. The tunnel 65 has a generally parallelepiped shape and opens through a transom 67 of the watercraft 10.

In the illustrated embodiment, a jet pump unit 66 propels the watercraft 10. The jet pump unit 66 is mounted within the tunnel 65 formed on the underside of the lower hull section 20 by a plurality of bolt. An intake duct 68 of the jet pump unit 66 defines an inlet opening 70 that opens into a gullet. The gullet leads to an impeller housing 72 in which the impeller 74 of the jet pump 66 operates. The portion of the impeller housing 72, which acts as a pressurization chamber, delivers the pressurized water flow to a discharge nozzle housing 74.

A steering nozzle 78 is supported at the downstream end of the discharge nozzle 76 by a pair of vertically extending pivot pins. In an exemplary embodiment, the steering nozzle 78 has an integral lever on one side that is coupled to the handlebar assembly 38 through, for example, a bowden-wire actuator, as known in the art. In this manner, the operator of the watercraft can move the steering nozzle 78 to effect directional changes of the watercraft 10.

A ride plate 80 covers a portion of the tunnel 65 behind the inlet opening 70 to enclose the jet pump unit 66 within the tunnel 65. In this manner, the lower opening of the tunnel 65 is closed to provide a planing surface for the watercraft.

An impeller shaft 82 supports the impeller 74 within the impeller housing 72. The aft end of the impeller shaft 82 is suitable supported and journalled within the compression chamber of the housing 72 in a known manner. The impeller shaft 82 extends in the forward direction through a bulkhead 84 that forms a front wall of the tunnel 65. A protective casing surrounds a portion the impeller shaft 82 that lies forward of the intake gullet.

The engine 12 powers the impeller shaft 82. The engine 12 is positioned within the engine compartment 18 and is mounted primarily beneath the control mast 26. Vibration absorbing engine mounts secure the engine 12 to the lower wall 56 of the lower hull 20. The engine is mounted in approximately a central portion of the watercraft 10.

In the illustrated embodiment, the engine 12 includes four in-line cylinders and operates on a four-cycle principle. The engine 12 is positioned such that the row of cylinders lies parallel to a longitudinal axis of the watercraft 10, running bow to stern.

Figure 4:
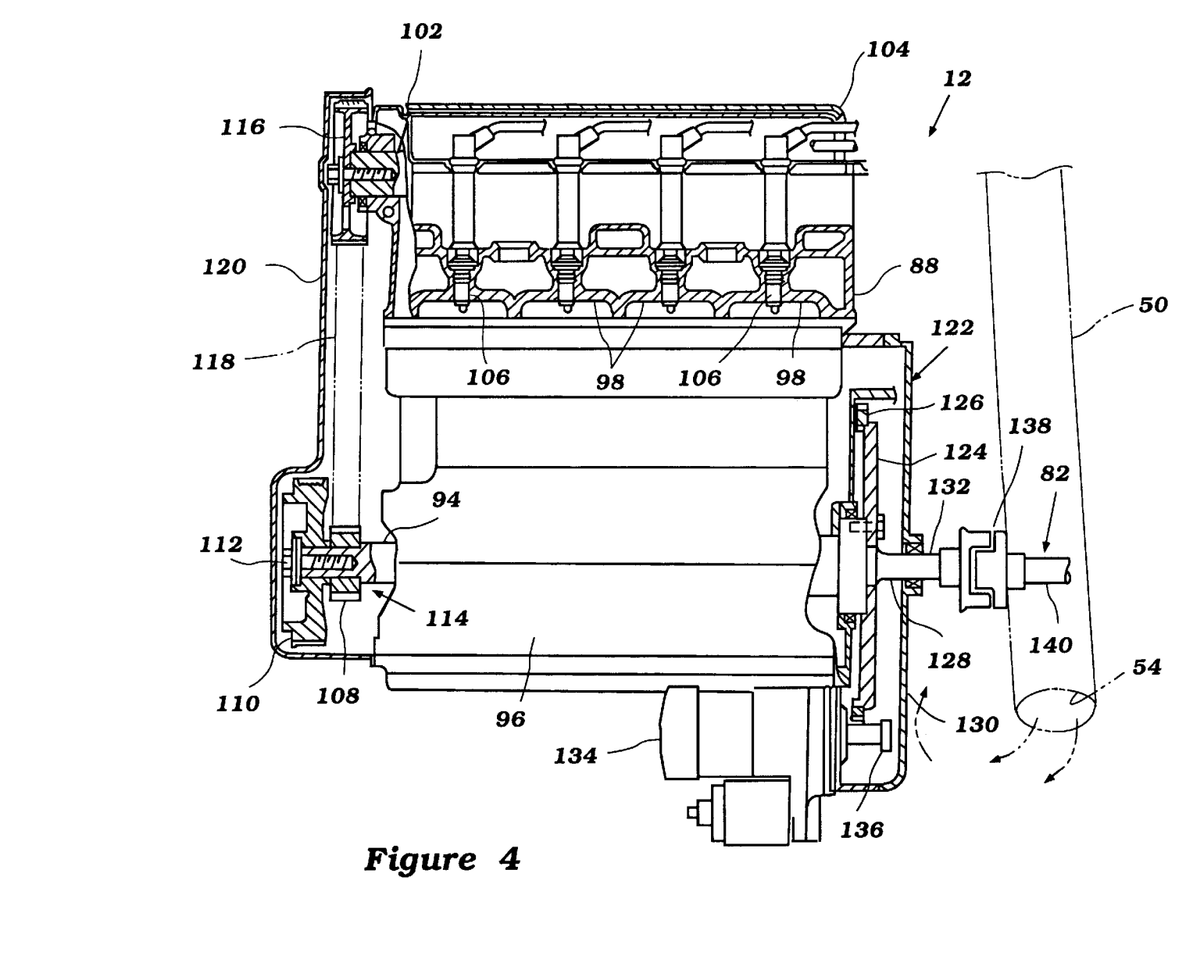
FIG. 4 is a partial sectional, side view of the watercraft engine of FIG. 2.

As best seen in FIGS. 3 and 4, a cylinder block assembly 86 and a cylinder head assembly 88 desirably form the cylinders of the engine 12. A connecting rod 94 links the corresponding piston 90 to a crankshaft 92 in a known manner. Each piston 90 reciprocates within its respective cylinder and together the pistons 90 drive the crankshaft 92.

The crankshaft 92 is journalled for rotation within a crankcase. The crankcase is formed by a crankcase member 96 attached to a skirt portion of the engine cylinder block assembly 86.

The cylinder head assembly 88 is attached to an upper end of the cylinder block 86. The lower face of the cylinder head 88 includes a plurality of recesses 98. Each recess 98 is arranged above a corresponding cylinder bore in the cylinder block 86 to close an upper end of the respective cylinder. At least two valve seats desirably are formed at the surface of each recess 98. The corresponding cylinder bore, piston 90 and cylinder head recess 98 of each cylinder form a variable-volume chamber, which at a minimum volume, defines a combustion chamber.

The cylinder head assembly 88 also includes a plurality of intake and exhaust valves 100, as well as intake and exhaust camshafts 102 which operate the valves 100. A cam cover 104 encloses the camshafts 102 and valves 100 within the cylinder head 88. The cam cover 104 also includes a recess accessible from the top of the engine which provides access to a plurality of spark plugs 106 of the engine 12.

Each combustion chamber of the engine 12 is provided with a single spark plug 106 for firing a charge therein. The cylinder head 88 includes a tapped mounting holes configured to receive the spark plug 106. The spark gap of the spark plug 106 lies within the combustion chamber with the spark plug 106 properly inserted into the mounting hole. A suitable ignition system (not shown), which is desirably electronically controlled, fires the spark plug 106 in accordance with a know firing sequence and timing schedule.

A pair of pulleys are attached to a front end of the crankshaft 92. For this purpose, the front end of the crankshaft 92 is turned down. A crankshaft pulley 108 is fit onto the front end of the crankshaft 92 and is driven by a spline connection. An alternator pulley 110 is also fit on the crankshaft 92 in front of the crankshaft pulley 108 and is driven by a spline connection. A bolt assembly 112 holds the pulleys 108, 110 onto the crankshaft front end. The alternator pulley 110 drives an electric alternator in a know manner.

The crankshaft pulley 108 forms part of a camshaft drive 114. A camshaft pulley 116 is attached to the front end of each camshaft 102. A timing belt 118 extends between the crankshaft pulley 108 and the camshaft pulleys 116 to drive the camshafts 102. The diameter of the camshaft pulleys 116 desirably are twice that of the crankshaft pulley 108 in order to drive the camshafts 102 at half the rotational speed of the crankshaft 92, as known in the art. A case cover 120 encloses the camshaft drive 114 on the front side of the engine 12.

A flywheel assembly 122 is located on the rear end of the engine 12. A flywheel magneto 124 is attached to the rear end of the crankshaft 92. A ring gear 126 is formed around the outer periphery of the flywheel 124. An output shaft 128 is attached to the flywheel 124 at the center of the flywheel assembly 122 such that the output shaft 128 is coaxial with the crankshaft 92. That is, both the crankshaft 92 and output shaft 128 rotate about the same axis.

A flywheel case cover 130 of the assembly 122 is attached to a rear end of the engine 12 and includes a central opening. The output shaft 128 extends through and is journal within the opening by a bearing assembly. A rear end 132 of the output shaft 128 lies outside the cover 130, to the rear side of the engine 12.

A starter 134 is attached to the crankcase member 96. A pinion 136 of the starter 134 cooperates with the ring gear 126 of the flywheel assembly 122 to rotate the flywheel 124 when the engine 12 is initially started, as known in the art.

A flexible coupling 138 interconnects the output shaft 128 to a front end 140 of the impeller shaft 82. Together, the flywheel 124, coupling 138 and propulsion unit function as a damper to reduce noise and vibrations in the watercraft 10 from the engine 12. In addition, by positioning the flywheel 124 between the end of the crankshaft 92 and the impeller shaft 82, the rigidity of the drive train is improved. As a result, the impeller shaft 82 rotates substantially simultaneously with the flywheel 124 to allow the flywheel 124 to absorb noise and vibrations due to torque fluctuations on the impeller shaft 82.

In order to prevent relative rotation of the output shaft 128 with respect to the impeller shaft 82, the two shafts 128,82 are preferably connected in secure interengaging fashion to and through the coupling 138. Preferably, the rear end 132 of the output shaft 128 is splined and fits within a grooved, hollow end of a first portion of the coupling 138. Similarly, the end of the impeller shaft 82 is splined and fits within a grooved, hollow end of the mating second portion of the coupling 138. The interengagement of the splines and grooves prevents the output shaft 128 and impeller shaft 82 from rotating with respect to the portion of the coupling 138 to which it is attached. In addition, the portions of the coupling 138 are removably secured to one another. This permits separation of the impeller shaft 82 from the output shaft 128, allowing, for example, the engine 12 to be removed from the watercraft 10 without removing the propulsion unit At the same time, the coupling 138 serves to rotate the impeller shaft 82 in direct relation to rotation of the output shaft 128.

An induction system 142 is located on one side of the engine 12 and supplies a fuel/air charge to the variable-volume chambers. In the illustrated embodiment, the induction system 142 includes an air intake silencer 144. The silencer 144 is located to the side of the cylinder head assembly 88. An inlet opening 145 of the silencer 144 opens into a plenum chamber within the silencer 144.

The plenum chamber of the silencer 144 communicates with a plurality of charge formers 146. The engine 12 desirably includes a number of charge formers 146 equal to the number of cylinders of the engine 12. In the illustrated embodiment, the charge formers 146 are floatless-type carburetors; however, other types of charge formers, such as, for example, fuel injectors, can also be used with the engine 12. Each carburetor includes a throttle valve disposed within a throat of the carburetor 146. A throttle shaft operates the valve to regulate the fuel/air charge delivered to the respective combustion chamber, as known in the art.

Each carburetor 146 communicates with at least one intake passage 148 formed within the cylinder head 86 via an intake runner of a intake manifold 150. At least one of the intake valves 100 operates within the cylinder head 88 between the intake passage 148 and the corresponding combustion chamber to control the influx of a fuel/air charge into the combustion chamber.

A fuel supply system delivers fuel to the charge formers 146. The fuel supply system includes a fuel tank 152 located in front of the engine 12. Although not illustrated, at least one pump desirably circulates fuel between the fuel tank 152 and the charge formers 146 through one or more delivery and return fuel lines.

An exhaust manifold 154 is attached to the opposite side of the cylinder head assembly 88. The exhaust manifold 154 includes a plurality of runners 156. Each runner 156 communicates with an exhaust port and corresponding exhaust passage 158 formed in the cylinder head 88. At least one of the exhaust valves 100 operates within the cylinder head 88 between the exhaust passage 158 and the corresponding combustion chamber to control the egress of exhaust gases from the combustion chamber. The exhaust manifold 154 communicates with an exhaust pipe (not shown) to discharge the exhaust gases from the watercraft in a conventional manner.

Figure 2:
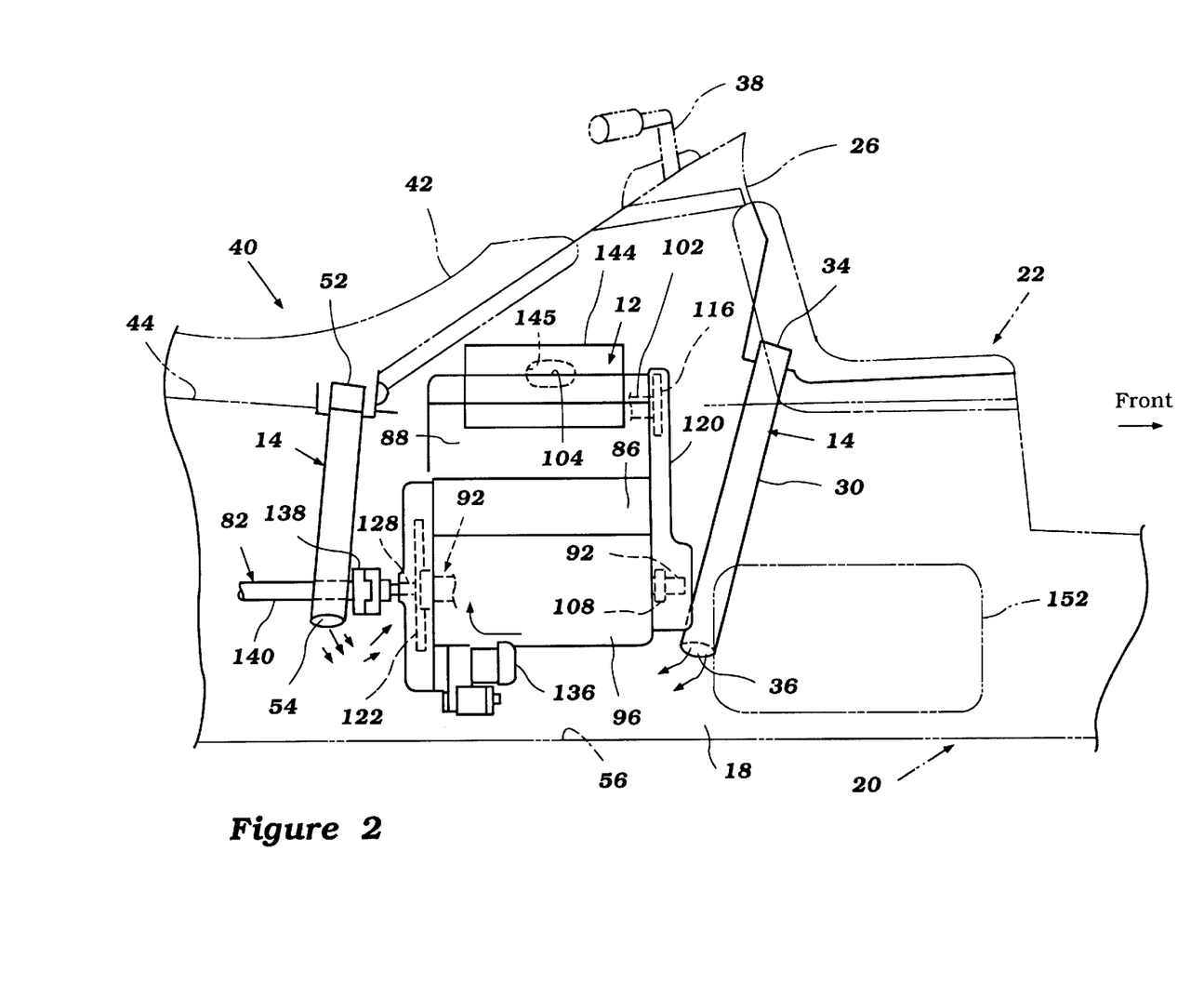
FIG. 2 is a side elevational view of an engine and a portion of a ventilation system configured in accordance with a preferred embodiment of the present invention, and illustrates in phantom a section of a surrounding hull that is configured in accordance with another exemplary embodiment of a personal watercraft.

As illustrated in FIGS. 1–4, the arrangement of the engine components and the air ducts 30, 50 within the engine compartment 18 is designed to promote cooling of the engine 12 and an air flow toward the induction system 142. The lower opening 36 of the air duct 30 is located at the bow side of and lower than the rotational axis of the crankshaft 92 and flywheel assembly 122. As schematically illustrated in FIG. 2, at least a portion of the air exiting the air duct opening 36 flows along a side of the crankcase member 96 and beneath the engine 12 until it strikes the case cover 130 of the flywheel assembly 122. The cover 130 directs the air flow upwardly over the side of the engine 12 to cool the engine 12.

The opening 54 of the rear air duct 50 also lies below the rotational axis of the impeller and output shafts 82, 128. In this position, the rear air duct 50 opens into the engine compartment 18 in the vicinity of the coupling 138. At least a portion of the air exiting the air duct opening 54, as schematically illustrated in FIG. 2, flows over the coupling 138 for cooling purposes. The case cover 130 of the flywheel assembly 122 then baffles the air flow upwardly over the side of the engine 12 and toward the induction system 142. The case cover 130 of the flywheel assembly 122 thus acts as a guide plate to direct at least a portion of the air flows from the air ducts 30, 50 upwardly over the engine 12 and toward the air intake 144. In this manner, the engine 12 is further cooled within the engine compartment and an ample supply of air is supplied is continuously provided to the induction system 142.

Figure 5:
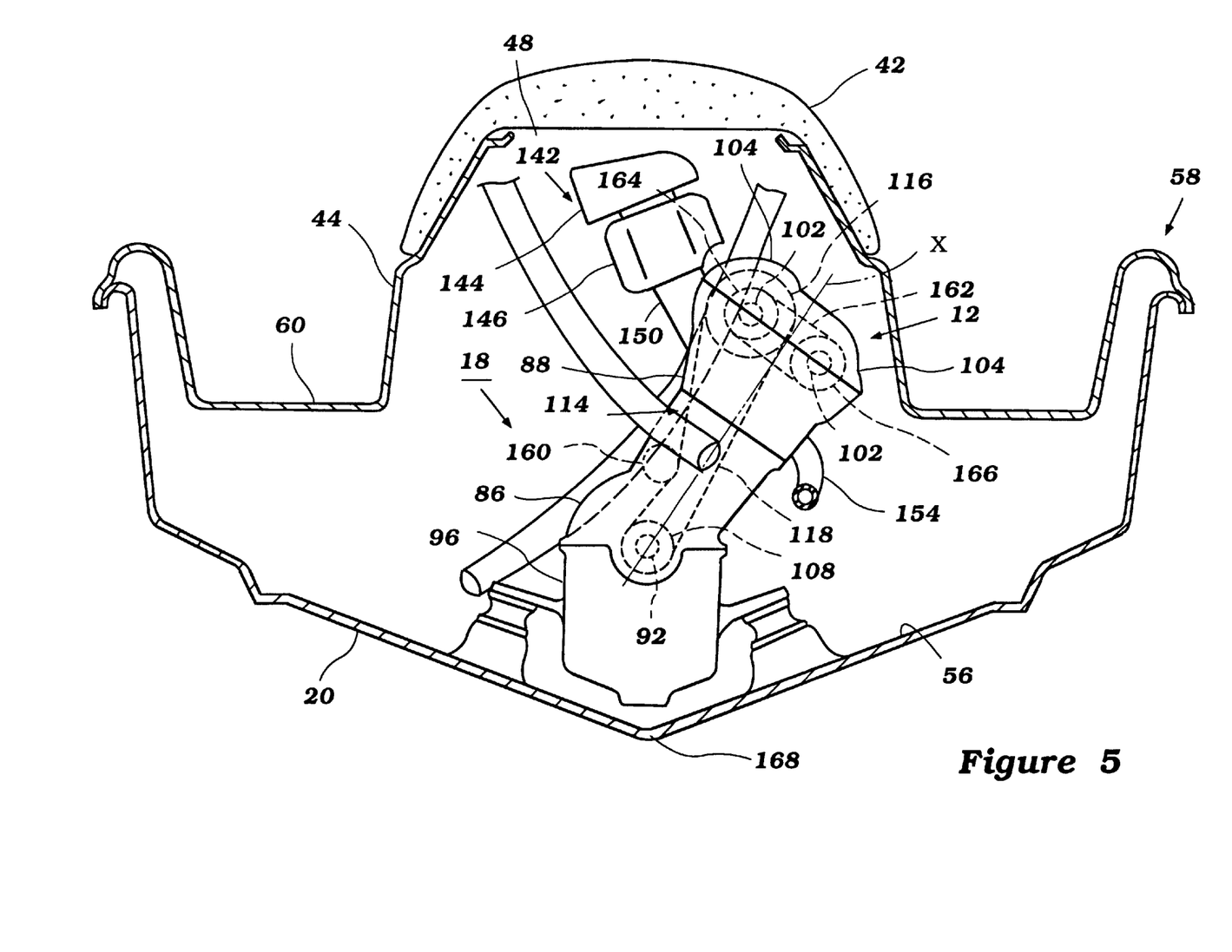
FIG. 5 is a cross-sectional view of a personal watercraft configured in accordance with another embodiment of the present invention.
Figure 6:
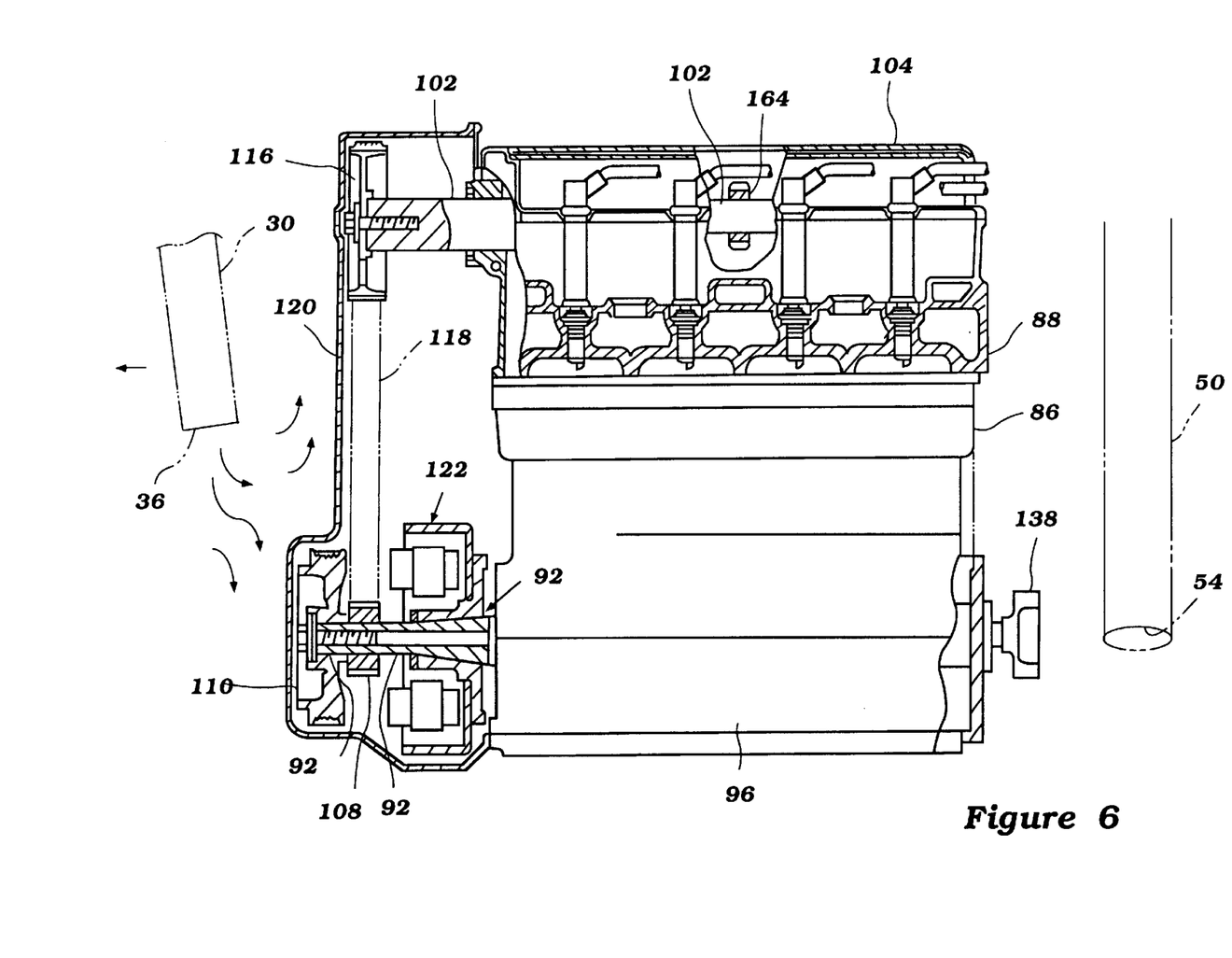
FIG. 6 is a partial sectional, side view of an engine of the watercraft of FIG. 5.

FIGS. 5 and 6 illustrate another embodiment of an engine and ventilation arrangement within a hull of a small watercraft in accordance with a preferred embodiment of the present invention. The principal differences between the embodiment of FIGS. 1–4 and the embodiment of FIGS. 5–6 lie with the orientation of the cylinders, and the flywheel assembly and the camshaft drive arrangements and constructions. Therefore, for ease of description, similar features are ascribed the same reference numerals used for corresponding elements from the embodiment of FIGS. 1–4. Unless otherwise indicated, the above description of similar components should be understood as applying equally to the following embodiment.

With reference to FIGS. 5 and 6, the engine 12 includes an inclined cylinder bank formed by a cylinder block 86 and a cylinder head assembly 88. The cylinder block 86 includes a plurality of cylinder bores arranged in an in-line configuration. The axes X of the bores are skewed relative to a central vertical plane in which the longitudinal axis of the hull and the rotational axis of the crankshaft 92 lie. In this manner, the cylinder bores lie over to one side of the central vertical plane to reduce the height of the engine 12, while increasing piston displacement for each cylinder.

The cylinder head assembly 88 is attached to the cylinder block 86. The cylinder head 88 supports and houses a plurality of intake and exhaust valves 100, as well as intake and exhaust camshafts 102 which operate the valves 100. The intake valves 100 control fuel/air charge influx into a respective combustion chamber through one or more intake passages 148 within the cylinder head 88, and the exhaust valves 100 control exhaust gas egress from the corresponding combustion chamber through one or more exhaust passages 158 within the cylinder head 88.

Intake and exhaust manifolds 150, 154 communicate with the cylinder head assembly 88 in the manners and for the purposes described above. The induction system 142 communicates with the intake manifold 150 and is located on the side of the cylinder head 88 near the central plane. In this position, the induction system 142 lies directly beneath the access opening 48. The exhaust system communicates with the exhaust manifold 154 and is located on a side of the cylinder head 88 closest to the lower wall 56 of the hull 16.

The crankshaft 92 is supported and is journalled for rotation in a crankcase. The crankcase is formed by a crankcase member 96 attached to a lower end of a skirt of the cylinder block assembly 86.

A camshaft drive 114 operates between the crankshaft 92 and the camshafts 102. In the illustrated embodiment, the camshaft drive 114 includes a crankshaft pulley 108 mounted onto a front end of the crankshaft 92, directly behind an alternator pulley 110. The crankshaft pulley 108 drives a camshaft pulley 116 attached to the front end of one of the camshafts 102 via a timing belt 118. A belt tensioner 160 is arranged on the front side of the engine 12 to tighten the timing belt 118 in a conventional manner.

In the illustrated embodiment, the second camshaft 102 is driven by the first camshaft 102 rather than by the crankshaft 92. For this purpose, as schematically illustrated in FIG. 5, a power transfer chain 162 extends between a drive gear 164 on the first camshaft 102 and a driven gear 166 on the second cam shaft 102. The gears 164, 166 desirably are located behind the front ends of the camshafts 102. The gears 164, 166 of this power transfer mechanism have the same diameters. The camshaft pulley 116 on the first camshaft 102, however, has a diameter that is about twice as large as the diameter of the crankshaft pulley 108. In this manner, the camshafts 102 both rotate at half the rotational speed of the crankshaft 92.

The use of a smaller driven gear 166 on the end of the second camshaft 102 allows the cylinder head assembly 88 and cylinder head cover 104 to have a reduced profile on the side on which the second camshaft 102 is located. The second camshaft 102 desirably is located on the side of the cylinder head 88 to which the cylinder bank is leaned in order to provide ample clearance and air flow between the cylinder head assembly 88/cylinder head cover 104 and the walls of the upper deck portion 22, as best seen in FIG. 5.

The flywheel magneto assembly 122 is located directly behind the camshaft drive 114 on the front side of the engine 12. A case cover 120 is attached to the front side of the engine 12 and encloses the camshaft drive 114 and the flywheel assembly 122 in this position.

The coupling 138 is disposed on the rear side of the crankshaft 92. The coupling 138 interconnects the rear end of the crankshaft 92 to the impeller shaft 82.

The front air duct 30 is arranged to open into the engine compartment 18 at a level corresponding to about the mid-height of the case cover 120 over the camshaft drive 114. As such, a portion of the air flow into the engine compartment 18 flows upward and another portion flows downward over the camshaft drive 114 and timing belt 118 so as to continuously cool the camshaft drive 114. The rear duct 50, although not illustrated, can be positioned to cool the coupling 138 and the engine 12 in the manner similar to that described above.

Figure 7:
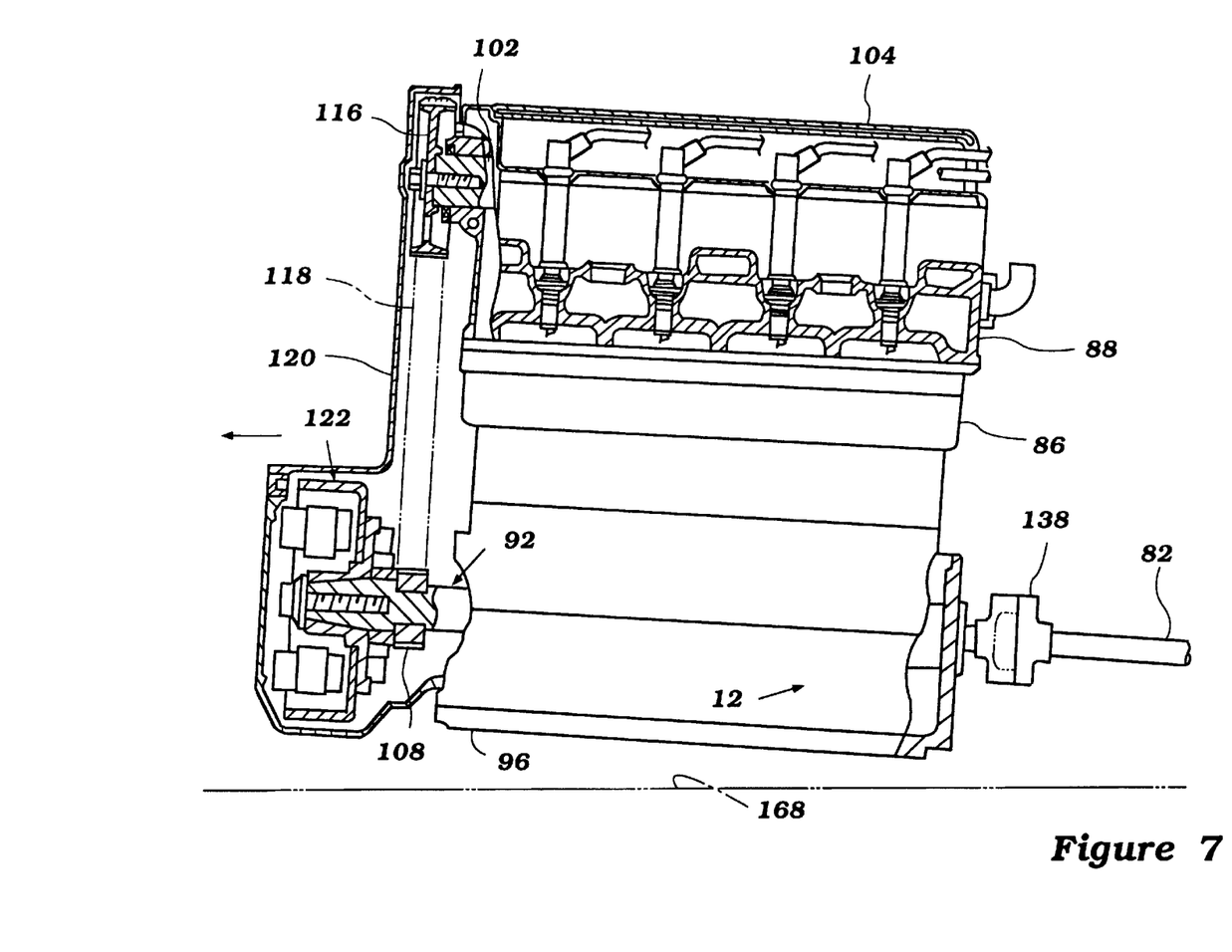
FIG. 7 is an alternative mounting arrangement for the engine of FIG. 6 within a hull of the watercraft.

FIG. 7 illustrates an additional mounting orientation of the engine 12 within the engine compartment 18. The four-cycle engine is mounted with it front side situated higher that its rear side relative to an aft segment 168 of the keel line 62 of the hull (FIG. 5). This mounting arrangement provides clearance between the engine 12 and the lower surface 56 of the hull 16 and provide sufficient space for larger engine components, such as, for example, a flywheel magneto assembly 122, on the front end of the crankshaft 92.

In the illustrated embodiment, the flywheel assembly 122 is fixed on the front end of the crankshaft 92. The crankshaft pulley 108 is fixed onto the crankshaft 92 directly behind the flywheel assembly 122. This arrangement further distances the flywheel 124 from the lower surface 56 of the hull 16 to allow for a larger diameter at the front end of the crankshaft 92. For example, as shown in FIG. 7, the periphery of a large diameter flywheel assembly 122 extends approximately to the bottom edge of the crankcase member 96, therefore requiring the surrounding cover 120 to extend beyond the bottom edge. The mounting orientation of the engine 12 provides the additional required clearance for such a large diameter flywheel assembly 122 and cover 120.

In addition, this mounting arrangement lowers the rear end of the crankshaft 92 relative to the keel line aft segment 168 of the hull 16. As a result, the impeller shaft 82 can be placed closer to the bottom of the hull 16, thereby reducing the vertical distance between the water inlet 70 and the pump housing 72. The length of the intake duct 68 is thereby decreased which improves pump efficiency and thrust performance.

As common to the embodiments described above, a four-cycle engine is arranged within the engine compartment in a manner with optimizes the air cooling effect of the ventilation system. The engine layout also helps direct an air flow within the compartment toward an induction system of the engine.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A small watercraft comprising a hull defining an engine compartment, and having at least one air duct that places the engine compartment in communication with atmospheric air outside the hull, the engine compartment being located between a bow and a stern of the watercraft, and an engine positioned within the engine compartment and powering a propulsion device, the engine including an air intake system supplying air into the engine and a flywheel assembly having a periphery, the air duct including an opening into the engine compartment which is at a location below an upper portion of the periphery of the flywheel assembly, the air intake system having an inlet opening which is located between the opening of the air duct and the flywheel in the longitudinal direction of the watercraft.

2. A small watercraft as in claim 1, wherein said engine includes at least one crankshaft, at least one camshaft, and a camshaft drive that operates between the crankshaft and the camshaft, the camshaft drive being located on a bow side of the engine.

3. A small watercraft as in claim 2, wherein said engine includes at least another camshaft, and the camshaft drive comprises a first power transfer device that operates between said crankshaft and at least one of the camshafts and a second power transfer device that operates between at least said two camshafts.

4. A small watercraft as in claim 1, wherein said duct is located on the bow side of the engine.

5. A small watercraft as in claim 1 additionally comprising another air duct which opens into the engine compartment at a point below the upper portion of the periphery of the flywheel assembly, and the air ducts are located on opposite bow and stern sides of the engine from each other.

6. A small watercraft as in claim 5, wherein said hull has a width defined in a lateral direction between port and starboard sides, and the air ducts are arranged to open into the engine compartment on opposite sides of the engine from each other in the lateral direction.

7. A small watercraft as in claim 5, wherein an opening of each air duct within the engine compartment lies below a level of an output shaft of the engine.

8. A small watercraft comprising a hull defining an engine compartment, and having at least one air duct that places the engine compartment in communication with atmospheric air outside the hull, the engine compartment being located between a bow and a stern of the watercraft, and an engine positioned within the engine compartment and powering a propulsion device, the engine including a flywheel assembly and a camshaft drive, the camshaft drive and the flywheel assembly being located on a bow side of the engine, the air duct including an opening into the engine compartment which is located on the bow side of and next to the camshaft drive.

9. A small watercraft as in claim 8, wherein the engine includes a crankshaft that rotates about a rotational axis which lies within a vertical plane, and a cylinder block assembly that defines at least one cylinder bore, the cylinder bore being oriented such that an axis of cylinder bore is inclined relative to the vertical plane.

10. A small watercraft as in claim 9, wherein said engine additionally includes a cylinder head assembly affixed atop the cylinder block assembly, the cylinder head assembly includes at least first and second camshafts, and said camshaft drive comprises a first power transfer device operating between said crankshaft and at least said first camshaft and a second power transfer device operating between at least said first and second camshafts.

11. A small watercraft as in claim 8, wherein the engine includes an output shaft, and the air duct opening lies at a level above a rotational axis of the output shaft.

12. A small watercraft as in claim 8 additionally comprising another air duct that includes an opening located within the engine compartment on a stern side of the engine.

13. A small watercraft as in claim 12, wherein said hull has a width defined in a lateral direction between port and starboard sides, and the air ducts are arranged to open into the engine compartment on opposite sides of the engine from each other in the lateral direction.

14. A small watercraft comprising a hull having a keel line with a generally straight aft segment that extends in a fore-aft direction, the hull further having a passenger area and a control mast, the passenger area including at least one straddle-type, longitudinal seat extending in the force-aft direction, the hull defining an engine compartment, and an engine positioned within the engine compartment beneath at least the control mast or seat, the engine powering a propulsion device and including a crankshaft arranged within hull to lie in the fore-aft direction and in an orientation that is skewed relative to the aft segment of the keel line, the engine further including a crankcase member with a bottom edge and a flywheel enclosed within a cover, the cover extending below the bottom edge of the crankcase member, the flywheel disposed on the crankshaft and arranged on the side of the engine at which the crankshaft is at its highest point relative to the aft segment of the keel line.

15. A small watercraft as in claim 14, wherein said crankshaft is oriented such that a distance between a fore end of the crankshaft and the aft segment of the keel line is greater than a distance between an aft end of the crankshaft and said aft segment of the keel line.

16. A small watercraft as in claim 14, wherein said engine includes a camshaft drive connected to the crankshaft.

17. A small watercraft as in claim 16, wherein said flywheel is located in front of said camshaft drive.

18. A small watercraft as in claim 17, wherein said flywheel is located on a fore end of the crankshaft.

19. A small watercraft as in claim 16, wherein said hull additionally includes at least one air duct which places the engine compartment in communication with atmospheric air outside the hull, and the air duct includes an opening that opens into the engine compartment in the vicinity of the camshaft drive.

20. A small watercraft comprising a hull defining an engine compartment, and having at least one air duct which places the engine compartment in communication with atmospheric air outside the hull, the engine compartment being located between a bow and a stern of the watercraft, and an engine positioned within the engine compartment and powering a propulsion device, the engine including a crankshaft and a flywheel assembly attached to an end of the crankshaft on a stern side of the engine, an output shaft connected to the flywheel assembly and a coupling connecting the output shaft to a drive shaft of the propulsion device and being located on the stern side of the flywheel assembly, the air duct including an opening that opens into the engine compartment on the stern side of the flywheel assembly, the coupling and the opening of the air duct being located next to each other so as to direct a flow of air over at least a portion of the coupling.

21. A small watercraft as in claim 20, wherein the flywheel assembly includes an upper rim portion, and the air duct opening is arranged within the engine compartment to lie at a level below the upper rim portion of the flywheel assembly.

22. A small watercraft as in claim 20, wherein said engine includes a camshaft drive which operates with a foreword portion of the output shaft on a bow side of the engine.

23. A small watercraft as in claim 20, wherein said hull additionally comprises another air duct which opens into the engine compartment at a point below the upper portion of the flywheel periphery, and the air ducts are located on opposite bow and stern sides of the engine from each other.

24. A small watercraft as in claim 1, wherein the flywheel assembly is located on a stern side of the engine.

25. A small watercraft as in claim 24, wherein the opening of the air duct in the engine compartment is positioned so as to lie on a front side of the flywheel in a longitudinal direction.

26. A small watercraft as in claim 20, wherein said hull additionally comprises another air duct which opens into the engine compartment and arranged so as to promote a flow of air across the engine between the air ducts and an engine air intake, and the flywheel and the coupling are located between the air ducts.

27. A small watercraft comprising a hull defining an engine compartment, and an engine positioned within the engine compartment and powering a propulsion device, the engine including the crankshaft rotating about a rotating axis which lies within a vertical plane and a cylinder head assembly affixed atop a cylinder block assembly, the cylinder head assembly including at least first and second camshafts, the first camshaft being closer to the vertical plane than the second camshaft, the engine further including a first power transfer device operating between the crankshaft and at least a first driven element attached to the first camshafts, and a second power transfer device operating between at least the first and second camshafts and including a second driven element attached to the second camshaft, the second driven element being smaller than the first driven element.

28. A small watercraft as in claim 27, wherein the hull further including a passenger area having a pair of foot areas, and the engine compartment is located between the pair of foot areas.

29. A small watercraft as in claim 27 additionally comprising at least one air duct that places the engine compartment in communication with atmospheric air outside the hull.

30. A small watercraft comprising a hull defining an engine compartment and having at least one air duct with at least one opening that supplies atmospheric air to the engine compartment, the engine compartment being located between a bow and a stern of the watercraft, and a propulsion system including an engine positioned within the engine compartment, the engine comprising a drive plate assembly including a ring gear and a crankshaft, the ring gear being coupled to the crankshaft, the engine further including an induction system which supplies air to the engine, the induction system being located between the air duct opening and the drive plate, and the air duct opening being located at a position below an upper periphery of the drive plate assembly.

31. A small watercraft as in claim 30, wherein the drive plate assembly comprises a flywheel with the ring gears being carried about a peripheral edge of the flywheel.

32. A small watercraft as in claim 30, wherein the drive plate assembly includes a housing that encloses at least a portion of the ring gear.

33. A small watercraft as in claim 1, wherein the opening of said at least one air duct within the engine compartment lies below a level of an output shaft of the engine and at least a portion of a flow of air from the at least one air duct during operation of the engine is directed first beneath the engine and then upwardly over a side of the engine.

34. A small watercraft as in claim 1, wherein the periphery of the flywheel assembly guides at least a portion of a flow of air from said at least one air duct upwardly over a side of the engine to cool the engine.

35. A small watercraft as in claim 27, wherein the first driven element has a diameter that is about twice that of the second driven element.

36. A small watercraft as in claim 27, wherein the second power transfer device includes a drive element attached to the first camshaft.

37. A small watercraft as in claim 36, wherein the drive element and the second driven element of the second power transfer device generally are the same size.

38. A small watercraft as in claim 30, wherein at least a portion of a flow of air from the air duct opening is guided by the periphery of the drive plate assembly over a side of the engine to cool the engine.

39. A small watercraft comprising a hull having a keel line that extends in a fore-aft direction, the hull further including a passenger area and a control mast, the passenger area including at least one straddle-type seat, the hull further including an engine compartment enclosing an engine powering a propulsion device and including a crankshaft arranged within the hull to lie in the fore-aft direction, the engine further having a flywheel magneto and a camshaft drive positioned on a first side of the engine, and the flywheel magneto and camshaft drive are enclosed by a first cover.

40. The small watercraft of claim 39, further including an accessory drive, and the accessory drive is enclosed within the first cover.

41. The small watercraft of claim 14, including a cover enclosing the flywheel, the cover having a bottom outer surface, and the crankcase chamber having a bottom outer surface, and the cover outer surface being closer to the aft segment of the keel line than an adjacent portion of the crankcase chamber bottom outer surface.

* * * * *